United States Patent

[11] 3,559,713

| [72] | Inventors | Anton Mueller<br>Unterkochen;<br>Guenter Witzel, Aalen, Wurttemberg, Germany |
|---|---|---|
| [21] | Appl. No. | 743,083 |
| [22] | Filed | July 8, 1968 |
| [45] | Patented | Feb. 2, 1971 |
| [73] | Assignee | Eisen- und Drahtwerk Erlan Aktieng-esellschaft<br>Aalen, Wurttemberg, Germany |
| [32] | Priority | July 8, 1967 |
| [33] | | Germany |
| [31] | | P1605672 |

[54] CLOSURE MEMBER FOR ANTI-SKID TIRE CHAINS
13 Claims, 6 Drawing Figs.

[52] U.S. Cl. .................................................. 152/243, 59/85
[51] Int. Cl. .................................................. B60c 27/00
[50] Field of Search ........................................... 152/241, 242, 243; 59/85, 86, 93

[56] References Cited
UNITED STATES PATENTS
19,955  4/1858  Snelling ........................ 59/85
FOREIGN PATENTS
694,016  7/1940  Germany ....................... 59/85

Primary Examiner—Arthur L. La Point
Assistant Examiner—George H. Libman
Attorney—Walter Becker ABSTRACT: A link with two sections releaseable from each other for antiskid tire chains. A first section is a nearly annular portion open radially with the free ends thereof extending in the same direction and forming approximately parallel stable cross section legs offset to extend toward each other at radially outer locations defining therebetween a passage for introducing link members into and withdrawing link members from the annular portion. A second section forms a closing member and has two receiving openings respectively detachably receiving the legs for closing and opening the passage. The legs are provided with shoulder means at radially inner location. The pin means releaseably extend transversely through the closing member at protected inner location and engage at least one of the shoulder means for detachably securing the closing member to the first section.

Inventors:
Anton Müller
Günter Witzel 3,559,713

CLOSURE MEMBER FOR ANTI-SKID TIRE CHAINS

The present invention relates to a closure member for antiskid tire chains, which comprises two sections adapted to be detached from each other. One of these two sections has two freely protruding legs which form an opening for introducing the links to be interconnected into said one section, whereas the other section forms a fish plate with openings for the legs for closing said one section.

Chain links have become known by means of which, for instance, the side chain of an antiskid chain can be closed. Such heretofore known closure member has a U-shaped yoke the legs of which have mounted thereon a shackle, and can be secured by means of nuts. Such closure members, however, are not suitable as replacement for damaged or broken annular links of the running and side portions of an antiskid tire chain because they do not fit as to shape into the link unit of the running part and are liable to damage the tire when resting against the tire under load. Furthermore, closure members of this type wear faster due to their form than other links of the chain so that they break already after a short time and may tear. The heretofore known closure members are furthermore not suitable as replacement for broken annular links because they can be fastened to the antiskid chain placed upon the tires, only under difficulties.

It is, therefore, an object of the present invention to provide a closure member for antiskid chains, which will overcome the above-mentioned drawbacks.

It is another object of this invention to provide a closure member for antiskid tire chains which will be suitable for annular links which are either broken or damaged so that damaged antiskid chains or tire protective chains can be effectively repaired on the spot.

It is also an object of this invention to provide a closure member for antiskid and tire protective chains which will be suitable as replacement for annular links of the running part of the chain.

It is still another object of this invention to provide a closure member, as set forth in the preceding paragraphs, which can be fastened also on an antiskid or tire protective chain while it is still on the tire.

These and other objects and advantages of the invention will appear more clearly from the following specification in connection with the accompanying drawings, in which.

Figure 3:
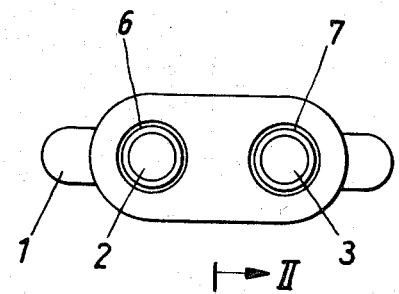
FIG. 3 is a bottom view of the closure member shown in FIG. 1.

A closure member according to the present invention for tire protective chains and antiskid chains with two sections detachable from each other, of which one section has two freely protruding legs forming a suspension opening for links to be interconnected, whereas the other leg forms a shackle with openings for receiving the legs, is characterized primarily in that section which comprises the legs is of a substantially annular shape, and that the closure shackle placed upon approximately parallel leg portions is secured by at least one clamping pin extending behind a shoulder of the leg.

Due to the annular design of one link section, two or more chain links to be interconnected can be suspended in said last mentioned section in simple manner even when the chain links are under pulling stresses so that these links are immediately, following the suspension thereof, temporarily secured and can no longer on their own leave the annular member. By mounting the shackle, the suspension opening of one link section can be closed in a simple manner and this closed condition will be assured by the clamping pins.

According to a further feature of the invention, a preferably partially circular shoulder is provided on the inner surface of the leg so that the clamping pin or pins are protected while the entire structure is simple.

According to a particularly advantageous further development of the invention, the closing shackle is of a U-shaped cross section, and the receiving openings are provided in the U-shaped transverse web while the clamping pin or pins are arranged in the U-shaped lateral webs. In this way, the closing shackle will, in spite of a relatively low weight have a great strength in the directions in which the closure member is subjected to load. Expediently, the free distance between the U-shaped lateral webs of the closing shackle equals the diameter of the legs of said one link portion while the free distance preferably equals the diameter of the receiving bores so that the legs of one link section rest on the inner surfaces of the lateral webs of the closing shackle in a safe manner.

The strength of the closure member according to the invention can furthermore be improved by having both legs of the link portion provided with a shoulder on which rests one pin each which is connected to the lateral webs of the closing shackle.

In order to obtain a possibly uniform inner surface of the closure member, the inner surface of the closing shackle forms substantially a continuation of the preferably circular inner surface of the other link section. Advantageously, the closing shackle is in side view substantially trapezoidal, and in top view substantially oval so that it has a low weight and will in any position of the closure member assure a careful engagement with the tire.

The closure member according to the invention may be produced in a simple manner when the legs are of round material. For purposes of increasing the strength, the round material is expediently of an oval cross section and preferably has a width which is less than the diameter of the legs.

Referring now to the drawings in detail and FIGS. 1—4 thereof in particular, the closure member illustrated therein comprises a link member 1, the substantially annular portion of which extends through approximately an angle of 300°. The ends of this annular portion merge with two substantially parallel offset legs 2, 3, respectively, which are located symmetrically with regard to the central axis of the annular section.

The legs 2, 3 have associated therewith a closing member or shackle 4 which when seen from the side (see FIG. 2) is of a U-shaped contour with a transverse section 5 having two bores 6, 7, one arranged behind the other. The diameter of these bores 6, 7, corresponds to the diameter of the legs 2, 3, and the distance between said bores 6, 7, corresponds to the distance between the legs 2 and 3. As will be seen from FIG. 4, the diameter of the bores 6, 7, equals the distance between the inner surfaces 8 of the lateral webs 9.

Figure 1:
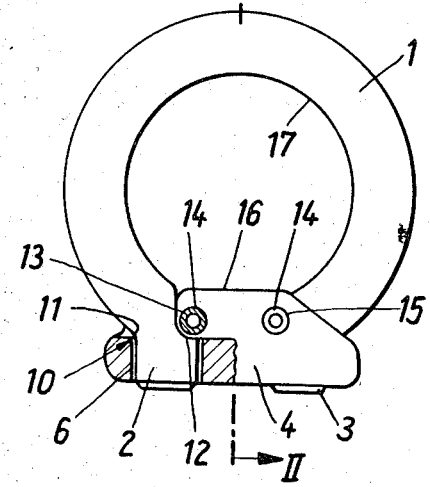
FIG. 1 is a side view of, and partial section through a closure member according to the invention.
Figure 2:
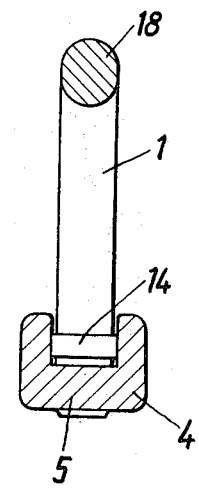
FIG. 2 is a section along the line II–II of FIG. 1.
Figure 4:
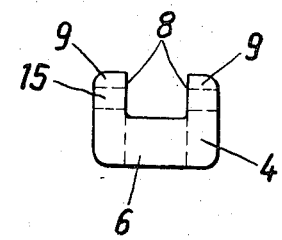
FIG. 4 shows the closing part of the closure member as seen in the direction of the arrow A of FIG. 1.

The closure member 4 is, in conformity with FIG. 1, so to be placed upon the legs 2, 3 of the annular portion 1 that the side lateral webs 9 of the closure member 4 engage the sides of the legs 2, 3. In mounted condition of the closing member 4, the free ends of the legs 2, 3 only slightly protrude beyond the member 4. Those marginal areas 10 of the bores 6, 7, which face away from the free ends of the legs 2, 3, have their outer area located opposite the rounded merging portions 11 of the outer surfaces of the annular sections 1 and opposite the legs 2, 3, so that in this way an abutment is formed which limits the mounting movement of the closing member 4. The marginal areas 10 are rounded accordingly.

As will also be evident from the drawings, the legs 2, 3, and those inner surfaces thereof which face each other, respectively are provided with a recess 13 forming a shoulder 12. This shoulder 12 is directed toward the central portion of the annular section 1 and is rounded over approximately a quarter of a circle. The said shoulders 12 have associated therewith clamping pins 14, respectively pressed into two oppositely located recesses of the lateral webs 9 of the closing member 4. By means of these pins 14, the closing member 4 is safely held on the section 1. Instead of the shoulders 12 formed by the recesses 13, the legs 2, 3 may be provided with bores or similar passages for the pins 14 or the like. These bores or passages may have a diameter corresponding to the diameter of the recesses 15 so that the closing member 4 will safely and without play be held on the annular section 1.

As indicated in FIGS. 1—4, the closing member 4 which when seen from the side, as shown in FIG. 1, is trapezoidal, and when seen from the top, as shown in FIG. 3, is oval has all edges rounded. The inner surface of the closing member 4 which is formed by the surfaces of the two lateral webs 9 or the shorter side of the trapezoid has a length which corresponds to the distance between the lateral surfaces of the recesses 13 of the two legs 2, 3, and substantially forms a continuation of the circular inner surface 17 of the section 1. The cross section 18 of the annular section 1 is, in the particular embodiment shown, of an oval contour.

Figure 5:
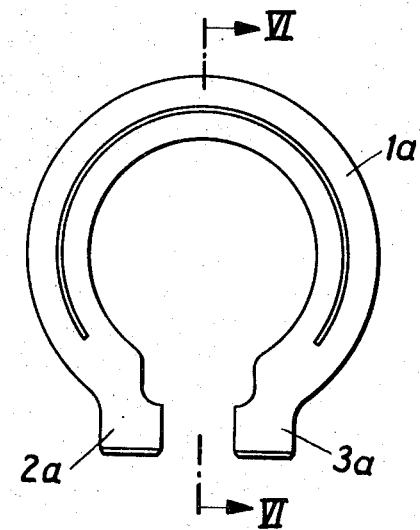
FIG. 5 represents a modified portion of a closure member according to the present invention.
Figure 6:
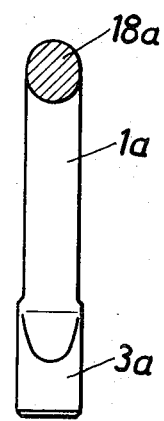
FIG. 6 is a section taken along the line VI–VI of FIG. 5.

With the embodiment illustrated in FIGS. 5 and 6, the circular section of the annular portion 1a is likewise of oval cross section 18a. However, the cylindrical legs 2a, 3a, have a diameter which is greater than the width of the oval cross section 18a and approximately corresponds to its height.

It is, of course, to be understood that the present invention is, by no means, limited to the specific embodiments shown in the drawings, but also comprises various modifications, the scope of the invention being defined by the claims.

We claim:

1. A link with two sections releaseable from each other for antiskid tire chains, which includes: a first section comprising a nearly annular portion open radially with the free ends thereof extending in the same direction and forming approximately parallel stable cross section legs offset to extend toward each other at radially outer locations defining therebetween a passage for introducing link members into and withdrawing link members from said annular portion, a second section forming a closing member and having two receiving openings respectively detachably receiving said legs for closing and opening said passage, said legs being provided with shoulder means at radially inner locations, and pin means releaseably extending transversely through said closing member at protected inner location and engaging at least one said shoulder means at radially inner location for detachably securing said closing member to said first section.

2. A link according to claim 1, in which said closing member has a U-shaped cross section and in which said receiving openings are provided in the transverse portion of said U-shaped cross section while said pin means are arranged in the leg portions of said U-shaped cross section.

3. A link according to claim 2, in which the clear distance between the legs of said U-shaped cross section corresponds approximately to the diameter of said legs.

4. A link according to claim 1, in which each of said legs comprises shoulder means and in which said pin means comprises two pins respectively resting on said shoulder means.

5. A link according to claim 1, in which said nearly annular portion extends over a circular area of approximately 300°.

6. A link according to claim 1, in which the legs are arranged substantially symmetrically with regard to the plane of symmetry of said nearly annular portion passing through the central axis thereof.

7. A link according to claim 1, in which the receiving openings have that marginal area which is adjacent to said nearly annular portion and located on the inside of said receiving openings rounded for abutment with that area of said first section where the legs merge with the annular portion of said first section.

8. A link according to claim 1, in which in assembled condition of said first and second sections the major portions of the legs of said first section are located in said receiving openings.

9. A link according to claim 1, in which that surface of said closing member which faces the interior of said nearly annular open portion substantially forms a continuation of the inner surface of said nearly annular portion.

10. A link according to claim 1, in which said closing member as seen from the side has a substantially trapezoidal contour, and in which that inner surface of said closing member which faces the interior of said nearly annular portion has a length at least approximately corresponding to the free distance between said legs within the area of said inner surface.

11. A link according to claim 1, in which said closing member when seen from the top has an oval contour.

12. A link according to claim 1, in which said nearly annular portion has a substantially circular cross section.

13. A link according to claim 1, in which said nearly annular portion has an oval cross section with the width of said oval cross section being less than the diameter of said legs.